UNITED STATES PATENT OFFICE.

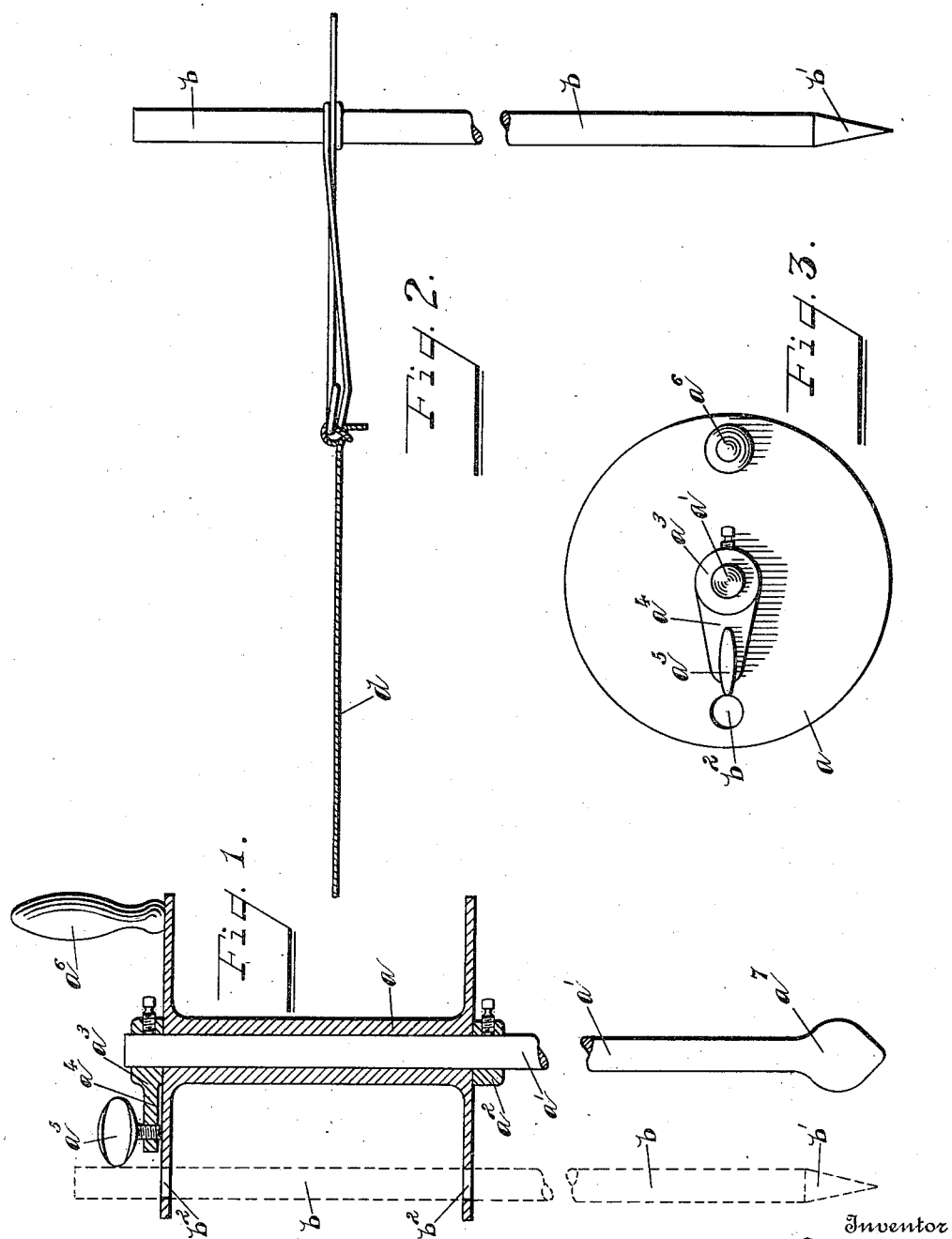

CHARLES E. PATRIC, OF SPRINGFIELD, OHIO.

LINE-MARKER.

1,017,061.  Specification of Letters Patent.  Patented Feb. 13, 1912.

Application filed February 3, 1910. Serial No. 541,758.

*To all whom it may concern:*

Be it known that I, CHARLES E. PATRIC, a citizen of the United States, residing at Springfield, in the county of Clark and State of Ohio, have invented certain new and useful Improvements in Line-Markers, of which the following is a specification.

This invention relates to improvements in line markers, the device being adapted for stretching a line across a field or garden for the purpose of guiding a planting machine or other garden implement, but being also adapted for other purposes.

An object of my invention is to provide a device of this character which will be simple in construction, easy and cheap to manufacture and effective in its operation.

The invention consists in the constructions hereinafter described and set forth in the claims.

In the accompanying drawings:—Figure 1 is a vertical sectional view of a portion of the device embodying my invention. Fig. 2 is also a view of this holding device shown attached to the anchor rod and having the line also attached thereto. Fig. 3 is a top plan view of the device illustrated in Fig. 1.

Like parts are represented by similar characters of reference in the several views.

In the said drawings, $a$ represents a reel, loosely mounted upon the rod $a'$ and confined against longitudinal movement thereon by the collars, $a^2$ and $a^3$, these collars being adapted to be secured to the said rod by set screws as shown. One of said collars, being the one $a^3$, in the present case, is provided with a projection $a^4$, having a screwthreaded perforation to receive a thumb screw $a^5$, which may be secured against the side of the reel to hold it in fixed relation with the rod $a'$. A handle $a^6$ provides the means for turning the reel on the rod for the purpose of winding up the line or tightening the same. The rod $a'$ is provided with a sharpened and flattened lower end $a^7$ so that it can be readily thrust into the ground, the flattened shape thereof preventing the rod from turning under the strain of the line.

$b$ is the anchor rod which has a pointed lower end $b'$ so that it may be readily driven or thrust into the ground.

Each side of the reel $a$ is provided with a perforation $b^2$, which perforations register with each other so that the anchor rod $b$ may be inserted therethrough and held in position therein in any suitable way when the device is not in use, such as by wrapping the end of the line around the same.

In the operation of the device the rod $a'$ which carries the reel may be driven into the ground, the set screw $a^5$, loosened, and the rod $b$, with the line $d$ attached carried to any suitable point and also driven into the ground. The line may then be stretched by means of the reel and the set-screw again tightened so as to hold the line in stretched condition. Or, the rod $b$ may be first driven into the ground and the rod $a'$ carried to a different point, the line, $d$, unwinding from the reel until the desired point at which the rod $a'$ is to be driven is reached; the set-screw $a^5$, of course, being loosened to permit the unwinding of the line and being again tightened to hold the same in stretched condition.

Having thus described my invention, I claim:

1. In a line marker for planting machines, a rod, a reel rotatably mounted thereon, and means on said rod for holding said reel in fixed relation thereto, said rod being provided with a sharpened, flattened lower end, substantially as specified.

2. In a line marker for planting machines, a rod having a sharpened lower end, a reel rotatably mounted thereon, means for holding said reel in fixed relation to said rod, a second rod with a sharpened end coöperating with said first rod in the operative condition of said marker, and registered perforations in the sides of said reel to receive said second rod in the inoperative condition of said marker, substantially as and for the purpose specified.

In testimony whereof, I have hereunto set my hand this 22nd day of January 1910.

CHARLES E. PATRIC.

Witnesses:
 CHAS. I. WELCH,
 OLIVER T. CLARKE.

Copies of this patent may be obtained for five cents each, by addressing the "Commissioner of Patents, Washington, D. C."